United States Patent [19]
You

[11] Patent Number: 5,997,970
[45] Date of Patent: Dec. 7, 1999

[54] FIBER-REINFORCED RODLIKE ARTICLE

[76] Inventor: Chin-San You, No. 6, Lane 477, Sec. 2, Feng-Shyn Rd., Feng Yuan City, Taichung Hsien, Taiwan

[21] Appl. No.: 08/877,023

[22] Filed: Jun. 17, 1997

[51] Int. Cl.⁶ .............................. B32B 3/02; B32B 5/08; B32B 5/12

[52] U.S. Cl. ................ 428/36.2; 87/6; 87/9; 87/41; 138/123; 138/124; 138/172; 156/169; 156/176; 156/177; 156/178; 428/36.1; 428/36.3; 428/105; 428/107; 428/111; 428/295.4; 428/297.1; 428/364; 428/374

[58] Field of Search .................................. 428/36.1, 36.3, 428/36.9, 36.91, 105, 295.1, 295.4, 297.4, 298.1, 299.7, 364, 374, 107, 111, 36.2, 297.1, 87; 138/123, 124, 172; 87/7, 8, 9, 41; 156/148, 149, 169, 170, 177, 178, 180

[56] References Cited

U.S. PATENT DOCUMENTS

| | | | |
|---|---|---|---|
| 4,657,795 | 4/1987 | Foret | 428/36 |
| 4,774,043 | 9/1988 | Beckmann | 264/134 |
| 5,698,055 | 12/1997 | Benkoczy | 156/149 |

*Primary Examiner*—Ellis Robinson
*Assistant Examiner*—Sandra M. Nolan
*Attorney, Agent, or Firm*—Browdy and Neimark

[57] ABSTRACT

A fiber-reinforced article comprises a tubular body and a plurality of fiber braids for reinforcing the tubular body. The fiber braids have a first section parallel to the axis of the tubular body, and a second section forming an angle with the axis of the tubular body. The second sections of the fiber braids form a network capable of enhancing the resistance of the article to flexure and torsion.

12 Claims, 3 Drawing Sheets

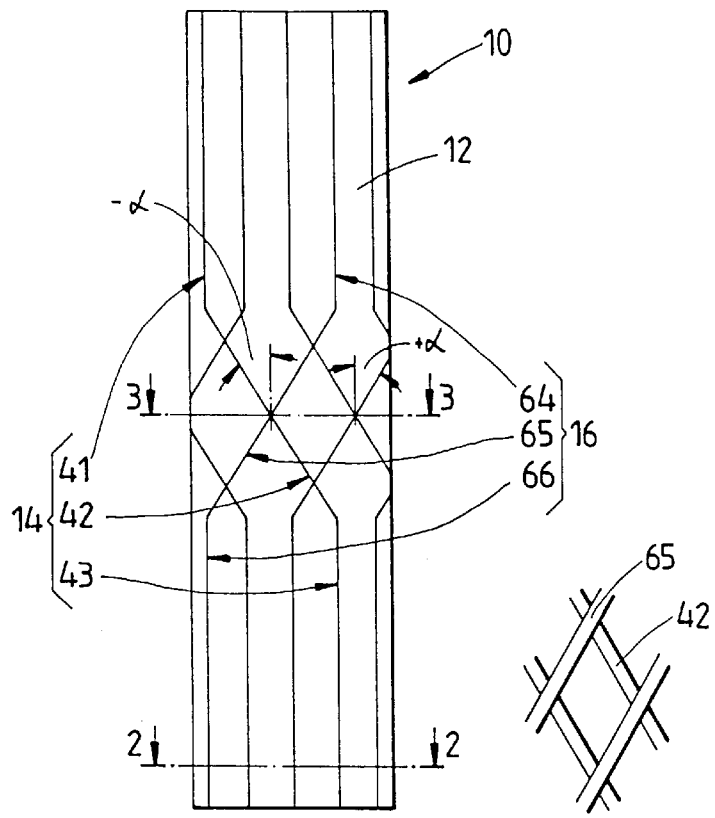
FIG. 1A
FIG. 1B
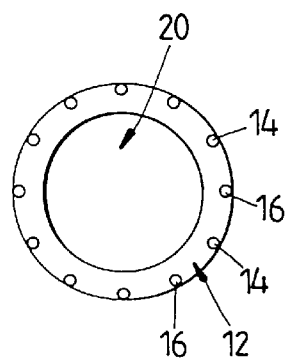
FIG. 2
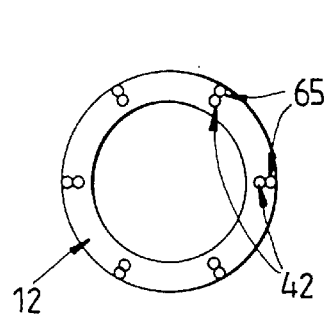
FIG. 3
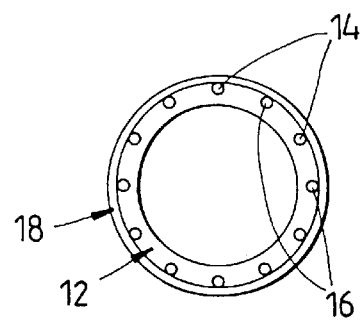
FIG. 4

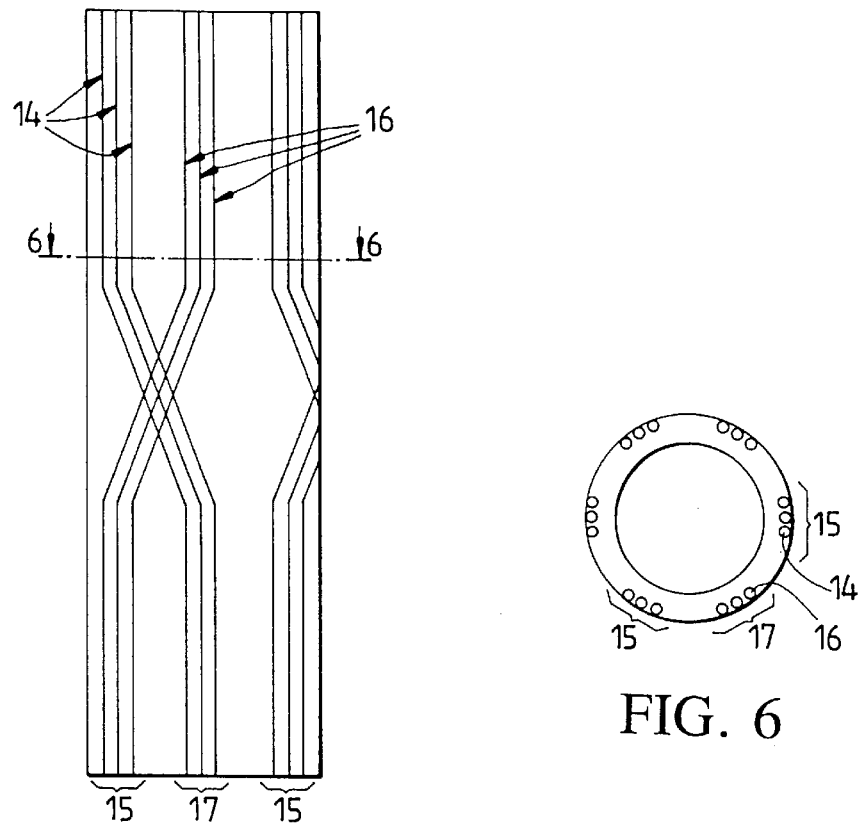
FIG. 6
FIG. 5
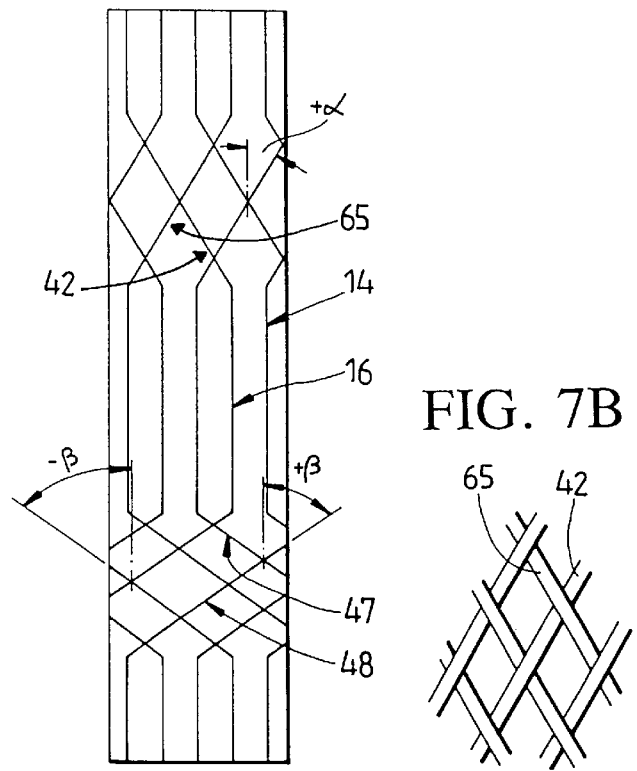
FIG. 7B
FIG. 7A

FIBER-REINFORCED RODLIKE ARTICLE

FIELD OF THE INVENTION

The present invention relates generally to a rodlike article, and more particularly to the rodlike article which is reinforced by fiber.

BACKGROUND OF THE INVENTION

Sports equipment, such as a game racket, golf club, billiard cue, hockey stick, ski stick, fishing rod, and even a bicycle frame, are generally made of a rodlike or tubular article of a thermoplastic or thermosetting plastic material. The rodlike or tubular article is generally reinforced by fiber braids, which are arranged spirally such that the fiber braids and the axis of the article form an angle so as to make the rodlike or tubular article more resistant to flexure and torsion. However, the rodlike or tubular article is often locally reinforced by a fiber-reinforced plastic composite material such that a specific area of the rodlike or tubular article has a greater resistance to flexure.

The process of reinforcing a specific area of the rodlike article is rather cumbersome and is not cost-effective. In addition, the local reinforcement of a rodlike article often results in an increase in the thickness and the weight of the rodlike article. Moreover, the interlacing fiber braids used for the reinforcement can undermine the external esthetic effect of the rodlike article. The rodlike article, which is reinforced by the fiber braids, is also vulnerable to severance caused by the concentration of stress. In order to remedy this drawback, the portion of the rodlike article, where the stress concentration is prone to take place, must be reinforced with a fiber fabric. The addition of the fiber fabric will undoubtedly result in an increase in the cost of making the rodlike article.

SUMMARY OF THE INVENTION

It is therefore the primary objective of the present invention to provide a rodlike article reinforced by the fiber braids capable of averting the stress concentration at the reinforced area of the rodlike article.

It is another objective of the present invention to provide a rodlike article reinforced by the fiber braids which are so arranged as to enhance the resistance of the rodlike article to flexure and torsion.

It is still another objective of the present invention to provide a rodlike article reinforced by the fiber braids which are so arranged as to enhance the external a esthetic effect of the rodlike article.

In keeping with the principle of the present invention, the foregoing objectives of the present invention are attained by a fiber-reinforced article of a rodlike construction. The article consists of a tubular body and a plurality of fiber braids. Each of the fiber braids has at least one first section parallel to the axis of the tubular body, and at least one second section forming an angle with the axis of the tubular body. The tubular body is so reinforced by the fiber braids as to be resistant to flexure and torsion, without compromising the esthetic effect of the rodlike article.

The foregoing objectives, features and functions of the present invention will be more readily understood upon a thoughtful deliberation of the following detailed description of the embodiments of the present invention with reference to the accompanying drawings.

BRIEF DESCRIPTION OF THE DRAWINGS

FIG. 1-A shows a front view of a first preferred embodiment of the present invention.

FIG. 1-B shows a partial enlarged view of the second section of the fiber braids of the first preferred embodiment of the present invention.

FIG. 2 shows a sectional view taken along the direction indicated by a line 2—2 as shown in FIG. 1-A.

FIG. 3 shows a sectional view taken along the direction indicated by a line 3—3 as shown in FIG. 1-A.

FIG. 4 shows a sectional view of a second preferred embodiment of the present invention, with the sectional view being taken along the direction similar to that of FIG. 2.

FIG. 5 shows a front view of a third preferred embodiment of the present invention.

FIG. 6 shows a sectional view of a portion taken along the direction indicated by a line 6—6 as shown in FIG. 5.

FIG. 7-A shows a front view of a fourth preferred embodiment of the present invention.

FIG. 7-B shows a partial enlarged view of the second section of the fiber braids of the fourth preferred embodiment of the present invention.

DETAILED DESCRIPTION OF THE INVENTION

Figure 8:
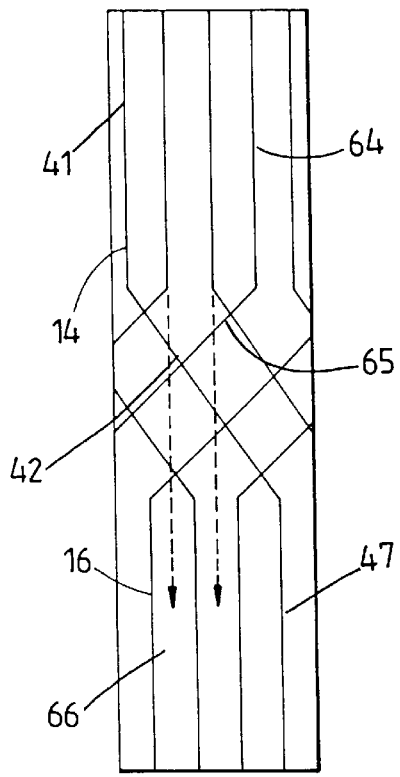
FIG. 8 shows a front view of a fifth preferred embodiment of the present invention.

As shown in FIGS. 1–3, a rodlike article 10 embodied in the present invention is composed of a body 12 and a plurality of first fiber braids 14 and second fiber braids 16.

The body 12 of a tubular construction is made of a thermoplastic or thermosetting plastic material and is provided with an axial hole 20. The body 12 has a length and a thickness. The body 12 may be solid.

The first fiber braids 14 are made of carbon fiber, boron fiber, glass fiber, titanium fiber, the "DYNEEMA" fiber made by DSM Corporation of the Netherlands, or the "KEVLAR" fiber made by the DuPont Corporation of the United States. Such fibers as mentioned above are strong and tough. The first fiber braids 14 are wound around the external surface of the body 12 such that they are separated from one another at an interval, and that they are respectively divided into a first section 41 corresponding to one end of the body 12, a second section 42 corresponding to the midsegment of the body 12, and a third section 43 corresponding to another end of the body 12. The first section 41 and the third section 43 are parallel to the axis of the body 12 while the second section 42 forms a first predetermined angle (+α) with the axis of the body 12. Both ends of the body 12 are respectively connected with the first section 41 and the third section 43.

The second fiber braids 16 are similar to the first fiber braids 14 in that they are made of the same material, and that they are arranged in the same manner. The second fiber braids 16 are respectively divided into a fourth section 64 corresponding to one end of the body 12, a fifth section 65 corresponding to the midsegment of the body 12, and a sixth section 66 corresponding to another end of the body 12. The fourth section 64 and the sixth section 66 are parallel to the axis of the body 12 while the fifth section 65 forms a second predetermined angle (−α) with the axis of the body 12. In view of the fact that the first predetermined angle (+α) is opposite to the second predetermined angle (−α), the second sections 42 and the fifth sections 65 form a network by superimposing one another, as illustrated in FIG. 1-B and FIG. 3.

The tubular body 12 is reinforced by the first fiber braids 14 and the second fiber braids 16, whose sections are extended continuously so as to reduce the chance of the stress concentration. In addition, the network formed by the second sections 42 and the fifth sections 65 serves to enhance the a esthetic effect of the tubular body 12. Since the second sections 42 and the fifth sections 65 are corresponding in location to the midsegment of the tubular body 12, the resistance of the midsegment of the tubular body 12 to flexure and torsion is greatly enhanced, thanks to the network formed by the second sections 42 and the fifth sections 65.

Now referring to FIG. 4, the rodlike article 10 of the present invention is provided on the outer surface thereof with a covering 18 attached thereto for protecting the first fiber braids 14 and the second fiber braids 16 at the time when the rodlike article 10 is polished mechanically. The covering 18 may be of a transparent coating material, such as a glass fiber cloth.

As shown in FIGS. 5 and 6, the tubular body 12 is provided with two first fiber braid groups 15 and two second fiber braid groups 17, which are arranged alternately on the outer surface of the tubular body 12. Each of the two first fiber braid groups 15 is made up of three first fiber braids 14 while each of the two second fiber braid groups 17 is made up of three second fiber braids 16. The first fiber braid groups 15 and the second fiber braid groups 17 are corresponding in location to the midsegment of the tubular body 12 such that they form four network areas, which serve to enhance the esthetic effect of the tubular body 12 and the resistance of the midsegment of the tubular body 12 to flexure and torsion.

As illustrated in FIG. 7, the rodlike article 10 of the fourth preferred embodiment of the present invention is characterized in design in that the first fiber braids 14 are provided respectively with a seventh section 47 forming a first predetermined angle (+β) with the axis of the tubular body 12, and that the second fiber braids 16 are provided respectively with an eighth section 48 forming a second predetermined angle (−β) with the axis of the tubular body 12, and further that the seventh sections 47 and the eighth sections 48 form a network. Since the α angles formed by the second sections 42 and the fifth sections 65 are different in degree from the β angles formed by the seventh sections 47 and the eighth sections 48, the network areas so formed are thus different from each other in resistance to flexure and torsion. In addition, as shown in FIG. 7(B) the network of the tubular body 12 of the fourth preferred embodiment of the present invention is formed of the first fiber braids 14 and the second fiber braids 16 by weaving instead of superimposing.

As shown in FIG. 8, the first section 41 of the first fiber braids 14 and the fourth section 64 of the second fiber braids 16 are parallel to the axis of the tubular body 12. However, the third section 43 of the first fiber braids 14 and the sixth section 66 of the second fiber braids 16 are not aligned with the first section 41 and the fourth section 64.

Figure 9:
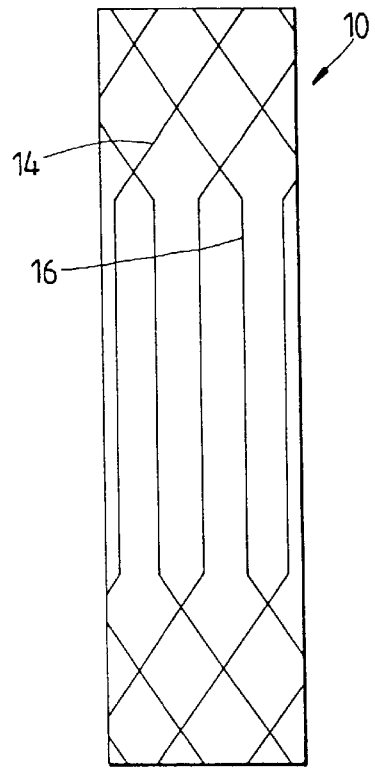
FIG. 9 shows a front view of a sixth preferred embodiment of the present invention.
Figure 10:
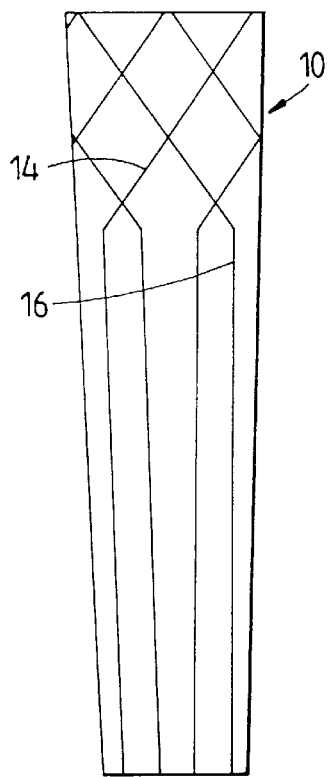
FIG. 10 shows a front view of a seventh preferred embodiment of the present invention.
Figure 11:
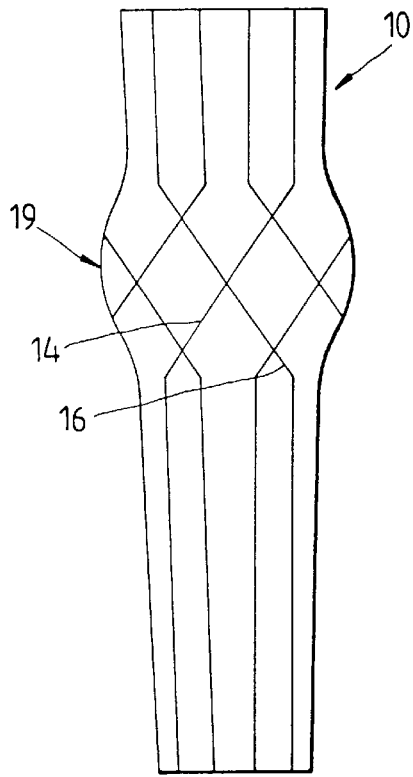
FIG. 11 shows a front view of an eighth preferred embodiment of the present invention.

As shown in FIGS. 9, 10 and 11, the first section 41 and the fourth section 64 or the second section 42 and the fifth section 65 may be varied in locality and quantity, depending on the specifications of the rodlike article 10 of the present invention. By comparing FIG. 9 with FIG. 7, it can be noted that the rodlike articles 10 of the sixth preferred embodiment and the fourth preferred embodiment are reinforced similarly in the structural strength. However, they are enhanced differently in the esthetic effect. As illustrated in FIG. 10, the present invention is also applicable to a tapered tube or rod. In addition, the present invention is applicable to a rodlike article 10 having a tapered body with an enlarged portion 19 which is formed by the networks of the first fiber braids 14 and the second fiber braids 16 for the purpose of absorbing shock.

What is claimed is:

1. A fiber-reinforced article comprising:
   a tubular body having a hollow or solid construction;
   a plurality of first continuous fiber braids arranged around said tubular body such that said first continuous fiber braids are parallel to one another and are extended along the direction of the longitudinal axis of said tubular body;
   wherein said first continuous fiber braids are divided into a first section of braids parallel to said longitudinal axis of said tubular body, and a second section of braids forming a first angle with said longitudinal axis;
   a plurality of second continuous fiber braids arranged around said tubular body such that said second continuous fiber braids are parallel to one another and extend along the direction of said longitudinal axis,
   wherein said second continuous fiber braids are divided into a third section of braids parallel to said longitudinal axis and a fourth section of braids forming a second angle with said longitudinal axis of said tubular body.

2. The article as defined in claim 1, wherein said second sections of said first fiber braids and said fourth sections of said second fiber braids are superimposed to form a network wherein said network can be located at a predetermined limited location on said tubular body.

3. The article as defined in claim 2, wherein said tubular body has a tapered shape.

4. The article as defined in claim 1, wherein said second sections and said fourth sections are weaved to form a network can be located at a predetermined limited location on said tubular body.

5. The article as defined in claim 1, wherein said first fiber braids further have a fifth section parallel to said axis of said tubular body; and wherein said second fiber braids have a sixth section parallel to said axis of said tubular body.

6. The article as defined in claim 5, wherein said first section and said fifth section are aligned.

7. The article as defined in claim 2, wherein said tubular body is provided with a transparent covering attached thereto such that said first fiber braids and said second fiber braids are located between said tubular body and said transparent covering.

8. The article as defined in claim 5, wherein said first fiber braids further have a seventh section, forming a second angle with said axis of said tubular body; and wherein said second fiber braids further have an eighth section forming a second angle with said axis of said tubular body.

9. The article as defined in claim 8, wherein first angles of intersection are formed respectively by intersection of said second section and said fourth section, and wherein second angles of intersection are formed respectively by intersection of said seventh section and said eighth section and are different in degree from said first angles of intersection.

10. The article as defined in claim 9, wherein said first angles of intersection are equal in degree to each other and are opposite in location to each other and wherein said second angles of intersection are equal in degree to each other and are opposite in location to each other.

11. The article as defined in claim 1, wherein said first fiber braids are arranged such that they are parallel to one another to form a first fiber braid group; and wherein said second fiber braids are arranged such that they are parallel to one another to form a second fiber braid group.

12. The article as defined in claim 2, wherein said tubular body is provided with an enlarged portion; and wherein said network formed by said second sections and said fourth sections is located at said enlarged portion.

* * * * *